United States Patent [19]

Slungaard et al.

[11] 4,217,156
[45] Aug. 12, 1980

[54] METHOD FOR SEALING A PLASTICS LID TO A CONTAINER OF PLASTICS-COATED PAPER BOARD AND APPARATUS FOR CARRYING OUT THE METHOD

[75] Inventors: Svein Slungaard, Slemmestad; Tom Frydendal, Oslo; Finn Skjelby, Spikkestad, all of Norway

[73] Assignee: Elopak A/S, Spikkestad, Norway

[21] Appl. No.: 879,944

[22] Filed: Feb. 17, 1978

[30] Foreign Application Priority Data

Feb. 18, 1977 [NO] Norway .................................. 770558

[51] Int. Cl.² .......................... B29C 27/04; B65B 7/28
[52] U.S. Cl. ........................................ 156/69; 53/478;
156/273; 264/26; 264/248
[58] Field of Search .................... 156/273, 272, 69;
264/25, 26, 248, 261, 263; 229/48 T; 53/477,
478, DIG. 2, 485, 329

[56] References Cited

U.S. PATENT DOCUMENTS

| 2,335,159 | 11/1943 | Salfisberg | 229/48 T |
|---|---|---|---|
| 2,402,943 | 7/1946 | Bogolowsky | 156/69 |
| 2,413,449 | 12/1946 | Hatch | 229/48 T |
| 2,510,727 | 6/1950 | Sussenbach | 229/48 T |
| 2,695,427 | 11/1954 | Sarge et al. | 264/26 |
| 2,723,517 | 11/1955 | Mittelmann | 53/DIG. 2 |
| 3,142,601 | 7/1964 | Polk et al. | 264/26 |
| 3,338,027 | 8/1967 | Amberg . | |
| 3,356,552 | 12/1967 | Pearl | 156/273 |
| 3,454,442 | 7/1969 | Heller | 156/273 |
| 3,574,031 | 4/1971 | Heller et al. | 156/272 |
| 3,604,880 | 9/1971 | O'Neill | 156/69 |
| 3,734,813 | 5/1973 | Pohl | 156/272 |
| 3,892,351 | 7/1975 | Johnson et al. | 229/48 T |
| 3,940,845 | 3/1976 | Czerwiak | 156/272 |
| 4,060,443 | 11/1977 | Balla | 156/273 |

FOREIGN PATENT DOCUMENTS

870453 6/1961 United Kingdom .................... 156/273

*Primary Examiner*—W. E. Hoag
*Attorney, Agent, or Firm*—Haseltine, Lake & Waters

[57] ABSTRACT

A method and an apparatus used for sealing a plastics lid to a container of plastics-coated paper board, the lidded container at several locations in the area which the lid joins the container, being supplied with energy in the form of electromagnetic microwaves, and the energy being absorbed in the paper board to melt for welding of the lid to the container.

8 Claims, 2 Drawing Figures

METHOD FOR SEALING A PLASTICS LID TO A CONTAINER OF PLASTICS-COATED PAPER BOARD AND APPARATUS FOR CARRYING OUT THE METHOD

BACKGROUND OF THE INVENTION

1. FIELD OF THE ART

The present invention relates to a method for sealing a plastics lid to a container of plastics-coated paper board, the lid preferably being put down over the top edges of the container with a certain holding pressure for closing of the container, and the lid preferably being provided with a substantially U-shaped groove extending along the circumference thereof and being open in the downward direction, said groove serving to receive the top edges of the container.

The invention also relates to an apparatus for carrying out the method.

2. DESCRIPTION OF THE PRIOR ART

A known method for sealing a lid to the top of a container consists in supplying heat to the lid and thereby to the container by heated jaws which are pressed against the lid. In such a method heat is supplied to the lid and the container by heat transfer from the outwardly facing surfaces and into the lid and the container. Consequently, the temperature at the outer surfaces must be higher than the temperature within the material to be heated, and a rapid heating requires a very high temperature of the jaws.

Such a heat supply by heat convection through heated jaws is not very convenient for sealing a plastics lid to a container of plastics-coated paper board in running production, because the supply of the necessary energy will require too much time unless the temperature of the jaws is kept very high. However, such a high jaw temperature implies that a plastics lid which has been manufactured by vacuum moulding will deform and shrink.

SUMMARY OF THE INVENTION

The object of the present invention is to give directions for a method for sealing a plastics lid to a container of plastics-coated paper board, which method does not suffer from the above mentioned disadvantages. According to the present invention the method is characterized in that the closed container at several locations in the area in which the lid joins the container, is supplied with energy in the form of electromagnetic microwaves, said energy substantially being absorbed in the paper board which is heated to a temperature which causes the coating of the paper board to melt for spot welding of the lid to the paper board.

Advantageously, the locations supplied with microwave energy may be subjected to a mechanical pressure which positively keeps the melted portions of the coating of the paper board in contact with the lid.

In practice, such a method may be carried out without deforming the plastics lid by the developed heat, since the absorption of microwave energy in plastics material is relatively small compared with the absorption of such energy in cardboard and paper provided these materials have an appropriate moisture content.

If the lid previously exercises a certain pressure on the top edges of the container the sealing can take place without the need for an additional mechanical pressure in the sealing zones, since the transformation of microwave energy to heat in the paper board can occur without mechanical contact between the microwave source and the parts which are to be supplied with heat and sealed. However, in connection with specific types of lids it may be convenient to use a mechanical pressure at the sealing locations, preferably concurrently with the suppply of microwave energy. If desired, a mechanical pressure may be effected subsequent to the supply of microwave energy.

The sealing of the lid is not made stronger than to permit the lid to be opened by the user at a later stage. In addition to provide a positive attachment of the lid to the container the sealing points also serve as a check on whether the container has been opened.

To ensure that the lid is correctly positioned prior to being sealed to the container a vertically directed pressure may be exerted on the lid prior to or concurrently with the supply of microwave energy to bring the lid in its final position.

An apparatus for carrying out the present invention comprises a power supply, a microwave generator and an applicator having wave-guides, and it is characterized in that the wave-guides of the applicator comprise four wave-guides in the form of a cross having arms of approximately equal length and extending beyond the circumference of the lid, the wave-guides at the crossing being supplied with microwave energy from the generator, that the applicator is provided with means for raising and lowering the wave-guides in the area of the lidded container, and that the arms at their free ends are provided with one or more means which in lowered position of the apparatus are positioned close to the side edge of the lid and serve to guide the microwave energy from the arms to the container through the lid.

In a preferred embodiment of the apparatus according to the invention the arms are attached to the walls of a chamber in which the upper part of the lidded container is positioned, metal bars depending from the inside of the walls, said metal bars being positioned inside of the means supplying the microwaves at a distance therefrom corresponding approximately to the width of the U-shaped groove along the circumference of the lid.

In the following the invention will be further described, reference being had to the drawing which shows a preferred embodiment of an apparatus according to the invention.

DESCRIPTION OF PREFERRED EMBODIMENTS

Figure 1:
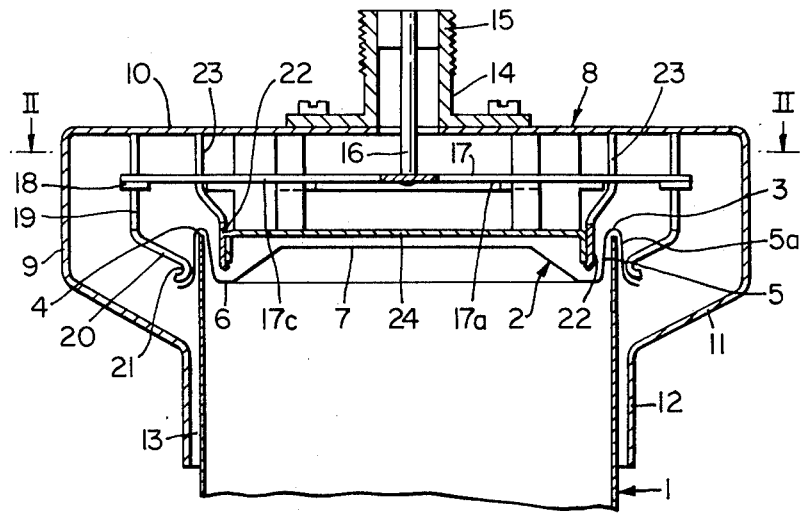
FIG. 1 is a diagrammatical vertical section through an embodiment of an apparatus comprising the present invention.
Figure 2:
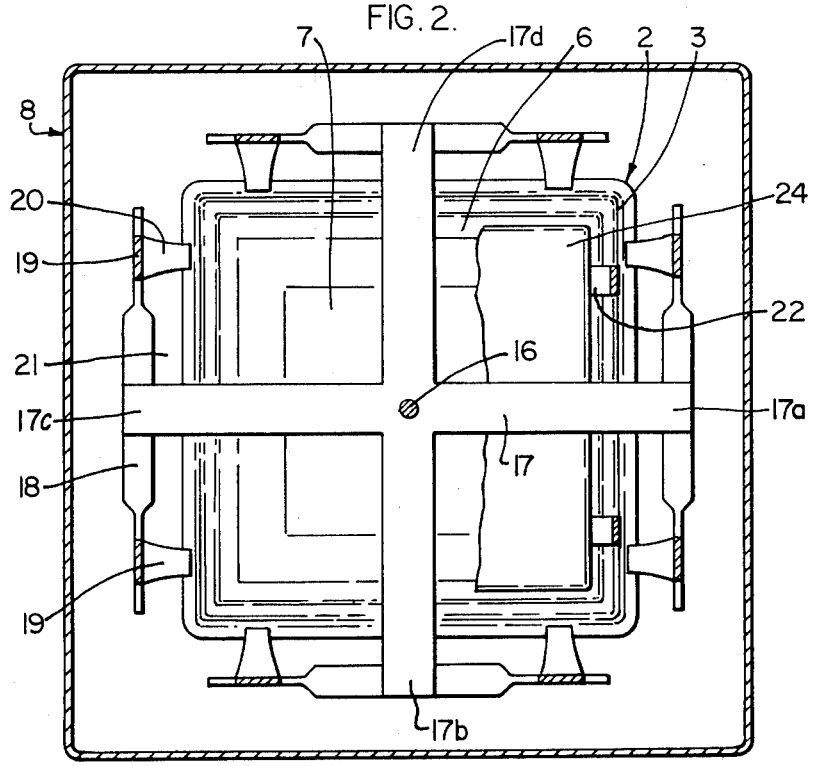
FIG. 2 is a section taken along the line II—II in FIG. 1 with some parts partly broken away.

In the drawing, 1 is the upper part of a container of plastics-covered paper board having an approximately square cross section. On the top of the container 1 there is put a plastics lid 2 which along its circumference has a U-shaped groove 3 having outer and inner flanges 5a, 5 which embrace the top edge 4 of the container, the inner flange 5 via a horizontal small portion 6 merging into a raised centre portion 7.

Over and around the lid 2 of the container there is in the drawing shown a so-called microwave applicator which is generally designated by 8, and which is equipped with controllable means not shown for giving the applicator 8 a reciprocating vertical movement. In its lower position, which is shown in FIG. 1, the applicator 8 encircles the upper part of the lidded container 1, whereas in an upper second position which is not shown, it has been raised sufficiently to release the container and allow removal thereof from below the applicator.

The applicator 8 which in the drawing is illustrated very diagrammatically, consists mainly of a chamber 9 having an upper portion 10 of larger cross sectional area than that of the container, said upper portions via bent side portions 11 merging into substantially vertical rim portions 12 having a shape and size such as to encircle the upper part of the container 1 with a relatively small clearance 13 which, however, is large enough for inserting the top of the container 1 into the chamber 9.

On the top of the chamber 9 i.e. on the portion 10 there is threaded a pipe connection 14 having external threads 15 onto which may be threaded a magnetron (not illustrated). The magnetron consists, as known, of an anode and cathode during which operation are supplied with different DC-potential, and it has a shape which is to the effect that the transmission of electrons between the cathode and the anode induces microwave oscillations having a frequency corresponding to the structure of the magnetron. The microwaves generated by the magnetron, which waves may for example have a frequency of 2450 MHz, are guided from the magnetron via an antenna. Such an antenna or wave-guide is in the drawing illustrated as a cylindrical rod 16 extending centrally through the pipe connection 14 and at its lower end being connected to a four-armed cross 17. At its free end each of the arms 17a–17d of the cross 17 carries a transverse rod 18 which at its ends merges into a combined holding and wave-guide bar 19. Thus, in the illustrated embodiment there are provided eight similar wave-guide bars 19, each of which at their upper end is attached to the inner walls of the chamber 9, whereas in the area below the transverse rods 18 it is bent to an inwardly curved portion 20 towards the lid 2 of the container.

The rod 16, the cross 17, the transverse rods 18 and the curved portions 20 of the bars 19 together constitute a compound wave-guide for the electromagnetic waves generated in the magnetron discussed above. The electromagnetic waves will spread along and follow the compound wave-guides until at the curved ends 21 of the curved portions 20 they are transmitted towards the container lid 2.

Since the absorption of microwave energy in plastics material is relatively small compared with the absorption of such energy in cardboard or paper board, most of the energy radiated from the wave-guide ends 21 will be absorbed by the cardboard of the container 1, so that heat is developed therein adjacent the ends 21. The heat development results in a sufficiently high temperature on the outer surface of the container, i.e. the surface facing the outer flange 5a of the lid, to melt the plastics layer on the paper board.

If the U-shaped groove 3 of the lid 2 exercises a pressure on the top edge 4 of the container, a sealing will be effected in the heated area between the lid and the container, the transfer of microwave energy to the paper board and the conversion thereof to heat in the paper board taking place without contact between the microwave source and the parts to be sealed. However, in connection with specific types of lids it may be expedient to apply a mechanical pressure at the sealing locations, this pressure preferably being exercised concurrently with the supply of microwave energy.

For this purpose four press bars 22 are provided in the chamber 9, each of which extending parallel to the inner flange 5 of the lid 2 and being attached to the inner wall of the chamber 9 by supporting bars 23. The pressing effect on the U-shaped groove 3 of the lid can be achieved either by placing the wave-guide ends 21 and the press bars 22 sufficiently close to each other and shape them so that they will press the flanges 5 and 5a of the U-shaped groove 3 together with a sufficiently large force to provide a sealing upon lowering the applicator to its operative position, observing of course that the pressure is not too large for the applicator to be removed without difficulty when the working operation has been completed.

In the illustrated embodiment, to ensure that the lid 2 is correctly positioned on the container the applicator 8 comprises a horizontal plate 24 extending between the press bars 22 and serving to exert a vertical pressure on the raised centre portion 7 of the lid when the applicator 8 is lowered to its operating position. Together with the plate 24 also the lower edges of the press bars 22 aid in this vertical pressing effect.

If desired, the wave-guide bars 19 and the press bars 22 may be arranged so as to be movable either by swinging or translatory movement, so that a mechanical pressure may be exerted for pressing together the U-shaped groove of the lid, preferably concurrently with or immediately subsequent to the supply of microwave energy.

In a movable design of the press bars 22 the pressing plate 24 must, of course, be attached in another way than that illustrated in FIG. 1, for example by being independently supported from the upper portion 10 of the chamber 9.

The disclosed apparatus provides a sealing of the lid which is strong enough to render a positive mechanical attachment of the lid to the container, but which is not stronger than to permit later breaking of the seal by the user. Aside from serving as a positive attachment of the lid to the container the seals also serve as a check for an unopened container.

In the disclosed embodiment of the apparatus according to the invention the sealing between the outer flange 5a of the groove 3 and the outer plastics layer of the container takes place in very limited zones. The welds can be broken when the user grips the flange 5a and bends or pulls it outwardly.

The apparatus can also be used for paper boards which besides from consisting of a double plastics-covered paper board blank also comprise a thin metal layer, such as aluminium. This foil is usually applied to the inside of the container and is coated with an additional layer of plastics. Thus, the foil makes no obstacle for the possibility of the paper board to absorb the microwave energy transmitted by the wave-guiding parts of the applicator 8. The aluminium foil reflects the transmitted microwaves, and such a reflection increases the intensity of the wave energy in the absorption area of the paper board. It is true that aluminium is a good heat conductor but since the heating of the paper board takes place very rapidly and since the aluminium foil radiates the heat in the plane of the paper board the developed heat will not give an unwanted high temperature in the inner plastics layer.

In connection with certain types of containers for once-for-all use it may be favourable to increase the number and size of sealing zones, if desired also letting the pressing bars 22, even if in a modified form, serve as microwave guides. In connection with lids of the type illustrated in the drawing there is then also obtained an inner sealing zone along the U-shaped groove of the lid, an effect which in most instances requires a breaking or cutting of the lid for opening the container.

The method and the apparatus according to the invention are especially suitable in connection with plastics-coated paper board containers having plastics lids manufactured by vacuum moulding, the supplied energy to the sealing zones not deforming or causing shrinking of the lids. Of course, the invention may also be used in connection with plastics lids which are manufactured by other methods, provided that the outer layer of the lid and the outer layer of the container have such properties that they in a sufficiently heated condition do not stitch to each other.

It is to be understood that the method and the applicator for the generation of a sealing of a plastics lid to a plastics-coated cardboard container also can be used in connection with a liquid tight sealing of the lid to the container. The individual wave-guides must then be given a specific design, which is to the effect that so much microwave energy is supplied along the U-shaped groove in the lid that a string of a material which has a viscous, sticky consistency and is prepositioned in the groove, becomes sufficiently easy-flowing so as to mould on the top edges of the container. At the termination of the supply of the microwave energy not only a spot sealing along the groove is then achieved by the cooling but also a liquid tight sealing. The liquid tight sealing develops since the sealing material chosen is a material which at normal room or storage temperature has a viscous consistency, but which when heated obtains a lower viscosity, the material having a dielectric constant which is very much higher than that of plastics.

It is to be understood that the invention is not limited to the above disclosed form of plastics container and lid. The invention may also be applicable in connection with containers which deviates from the rectangular form and which has a lid without any form of groove. Preferably the invention will find application in connection with the types of containers which together with the lid are stiff enough to yield a sufficient counterpressure against the applicator means which effect a mechanical pressure for positive abutment of the melted layer portions against the lid.

What we claim is:

1. In a method for sealing a lid to a container, comprising in combination the following steps: providing a container having at least one wall and a bottom, said container being comprised of plastics-coated paperboard, the paperboard having a relatively high dielectric constant compared with the plastics of the layers coating the paperboard; providing a plastics lid with a circumference having a U-shaped groove with inner and outer flanges adapted to embrace the top edge of the container, the inner flange being bent inwardly at a right angle to a small horizontal portion merging into a raised center position, said plastics of the lid having a relatively low dielectric constant compared with the paperboard of the container: placing said plastics lid on the top edge of the container for the closing thereof; the improvement comprising supplying energy in the form of electromagnetic microwaves at specific, limited areas of the lid flanges which join the container so as to effect a spot-welding of the lid to the container which is strong enough to render a positive mechanical attachment of the lid to the container, but which is not stronger than to permit later breaking of the welds by a user, said energy to be absorbed in the paperboard of the container which is to be heated to a temperature sufficiently high for melting the plastics coating of the container to thereby effect welding of container coating to the lid flanges in the specific areas of the melted paperboard plastics coating.

2. A method as defined in claim 1 including the step of applying vertically directed pressure on the lid for proper positioning before said step of supplying energy in form of electromagnetic microwaves.

3. A method as defined in claim 1 including the step of applying vertically directed pressure on the lid for proper positioning concurrently with the step of supplying energy in form of electromagnetic microwaves.

4. A method as defined in claim 1 wherein said energy is supplied to the top of the lidded container from both the inner and the outer side thereof for obtaining inner and outer sealing along said U-shaped groove of said lid.

5. A method as defined in claim 1 including the step of applying mechanical pressure in the area of the lid flanges which join the container for holding the melted layer portions of the paperboard in contact with the lid.

6. A method as defined in claim 5 wherein said step of applying mechanical pressure takes place concurrently with the step of supplying energy in form of electromagnetic microwaves.

7. A method as defined in claim 5 wherein said step of applying mechanical pressure takes place subsequent to the step of supplying energy in form of electromagnetic microwaves.

8. A method for sealing a lid to the container, comprising in combination the following steps: providing a container having at least one wall and a bottom, said container being comprised of plastics-coated paperboard, the paperboard having a relatively high dielectric constant compared with the plastics of the layers coating the paperboard, providing a plastics lid with a circumference having a U-shaped groove with inner and outer flanges adapted to embrace the top edge of the container, the inner flange being bent inwardly at a right angle to a small horizontal portion merging into a raised position, said plastics of the lid having a relatively low dielectric constant compared with the paperboard of the container; the improvement comprising positioning into said U-shaped groove a string of material having a viscous sticky consistency at room temperature and easy flowing when heated above room temperature, placing plastics lid on top edge of the container for the closing thereof, supplying energy in the form of electromagnetic microwaves along the U-shaped groove for causing the string of viscous sticky consistency to mold on the top edges of the container and for causing the coating of the container to melt at specific limited areas thereof, so as to effect a combined spot welding of the lid to the container due to the melting of the container coating to the lid flanges and a liquid tight sealing due to the sticky string molding the top edges of the container.

* * * * *